United States Patent [19]

Koseki

[11] Patent Number: 4,641,314
[45] Date of Patent: Feb. 3, 1987

[54] LASER TUBE HOLDER IN A LASER OSCILLATOR

[75] Inventor: Ryoji Koseki, Buena Park, Calif.

[73] Assignee: Amada Engineering Service Co., Inc., La Mirada, Calif.

[21] Appl. No.: 816,252

[22] Filed: Jan. 6, 1986

[51] Int. Cl.⁴ .............................................. H01S 3/03
[52] U.S. Cl. .................................................... 372/65
[58] Field of Search ...................... 372/65, 61, 55, 107

Primary Examiner—Leon Scott, Jr.
Attorney, Agent, or Firm—Wigman & Cohen

[57] ABSTRACT

A laser tube holder allows axial alignment of the laser tube with a laser oscillator. An inner eccentric holder and an outer eccentric holder have eccentric outer surfaces and rotatably support a cylindrical laser tube joint holder on a support plate in the laser oscillator. When the eccentric holders are rotated the laser tube is axially displaced for alignment. Flanges on each of the eccentric holders are disposed on opposite sides of the support plate. An O-ring and a pressure ring disposed in a groove in one of the flanges allow adjustment of the pressure on which the eccentric holder are retained on the support plate.

7 Claims, 5 Drawing Figures

LASER TUBE HOLDER IN A LASER OSCILLATOR

BACKGROUND OF THE INVENTION

1. Field of the invention

This invention relates to a laser oscillator. More specifically, it relates to a laser tube holder which supports the laser tube in an axial flow type gas laser oscillator.

2. Description of the Related Art

In an axial flow type laser oscillator, in order to increase the output the length of the laser tube is increased, and the laser tube is divided into a number of sections, with electrical discharges in each section to excite laser oscillations. In a configuration in which, as described above, there are electrical discharges in a number of sections of a laser tube, in order to supply laser gas to each section and to remove laser gas from each section, the sections of the laser tube are separated. The separated sections of the laser tube have supply openings for the supply of laser gas, and there are exhaust tubes between the laser tube sections to remove laser gas. The said laser tube and exhaust tubes are connected through suitable joint members.

In an axial flow type laser oscillator with a configuration such as is described above, it is important that the entire laser tube be aligned along a single straight line. If the linearity of the laser tube is poor and the discrepancy between the axis of the laser tube and the laser beam axis becomes large, then the laser beam mode pattern, can be causing a drop in output.

Consequently, in the prior art, in order to make the laser beam axis coincide with the laser tube axis, the joint members which support a connecting portion between the laser tube and the exhaust tube separated from the laser tube are mounted on holder plates. Various configurations have been used to make the axis of these joint members coincident with the laser beam axis. However, in the conventional apparatus, when the joint members are fixed to the holder plates it is easy for a discrepancy to occur between the axes of the joint members and the laser beam axis, and adjustment is very difficult.

SUMMARY OF THE INVENTION

The first purpose of this invention is to provide a laser tube holder which makes it easy to perform centering adjustment of the joint sections between the laser tube and the exhaust tubes.

The second purpose of this invention is to provide a laser tube holder which permits fine adjustment of the axis of the joint holders which support the laser tube and the exhaust tubes in all directions perpendicular to the axis.

In order to achieve the said objectives, in this invention there are cylindrical joint holders which support the laser tube connecting portions in the laser oscillator. Eccentric cylindrical sections are formed in the inner eccentric holders which mate with and support these joint holders so that they are free to rotate with respect to the print holder Eccentric cylindrical sections which are formed in the outer eccentric holders which mate with and support the eccentric cylindrical sections of the inner eccentric holders so that they are free to rotate with respect to the inner eccentric holder are mated with and supported by the laser oscillator holder plates.

BRIEF DESCRIPTION OF THE DRAWINGS

Referring to FIG. 1, generally designated by the reference numeral 1 is a laser processing system which is provided with a laser oscillator 3. The laser oscillator 3 is mounted on the rear of the laser processing system 1 so as to generate a laser beam LB in the direction toward the laser processing system 1.

Figure 1:
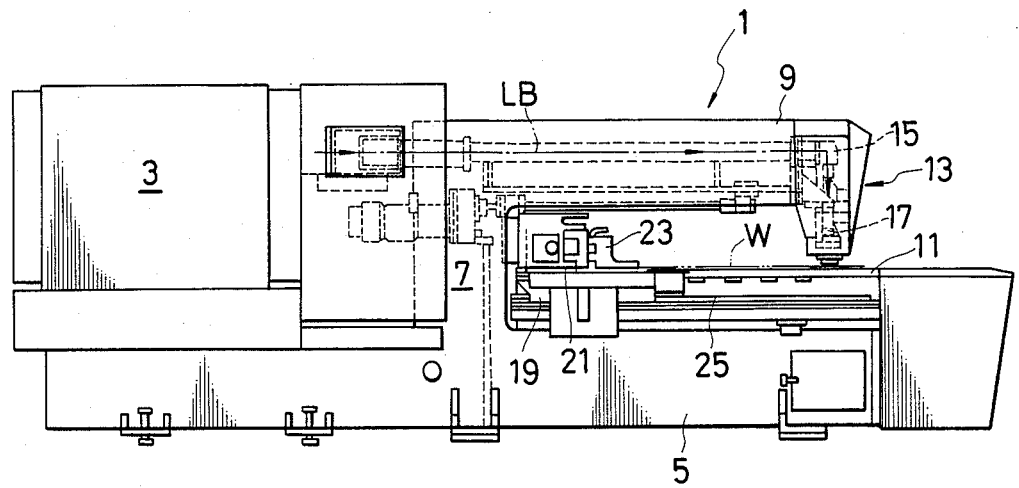
FIG. 1 is a front elevational view of a laser processing system provided with a laser oscillator according to the present invention.

The laser processing system 1 consists of a base 5, a post 7 which rises perpendicularly from the base 5, and an overhead beam 9 which is provided above and supported horizontally in a cantilever manner by the post 7. Disposed on the base 5 is a work table 11 on which a large number of slide balls are rotatably positioned to support a sheet workpiece W to be processed in a horizontal position. A processing head assembly body 13 is mounted on the free end of the above-mentioned overhead beam 9; a mirrow assembly 15 and a light focusing lens 17 are built into the processing head assembly body 13. The above-mentioned mirror assembly 15 reflects laser beam LB generated by the laser oscillator 3 in the direction of workpiece W. The light focusing lens 17 concentrates the light of laser beam LB and is mounted in such a position that it aims laser beam LB at the work piece W together with an assisting as such as oxygen. Consequently, the laser processing system 1, which is constructed as described previously, receives the laser beam LB from the laser oscillator 3 and aims the laser beam LB at the workpieces W through the light focusing lens 17 which is mounted inside the processing head assembly 13.

In order to move and position in place the workpiece W to be processed, the laser processing system 1 has a first carriage 19 which is free to move horizontally and a second carriage 21 which has a plurality of clamping devices 23 which clamp the workpiece W in position. The first carriage 19 is movably supported on a pair of rails 25 which are mounted parallel to each other on the base 5 along the opposite sides thereof, and is free to move toward and away from the processing area directly below the processing head assembly 13, when driven by power. The second carriage 21 which has the clamping devices 23 is slidably supported on the first carriage 19 and movable horizontally when driven in a direction perpendicular to the above-mentioned rails 25. Consequently, the workpiece W which is clamped in place by the clamping devices 23 can be moved on the work table 11 by the motion of the first carriage 19 and the second carriage 21 to a position directly below the processing head assembly 23.

In the above-mentioned configuration, by positioning the workpiece W immediately below the processing head assembly 13 on the work table 11 by means of the motion of the first carriage 19 and the second carriage 21, the workpiece W is processed by the laser beam LB. Of course, the laser beam LB, which is generated by the laser oscillator 3, is directed at the processing head assembly 13 and directed downward as shown by the arrow by the mirrow assembly 15. Then, after the light is concentrated by the light focusing lens 17, it is directed at the workpiece W together with an assisting gas such as oxygen.

Figure 2:
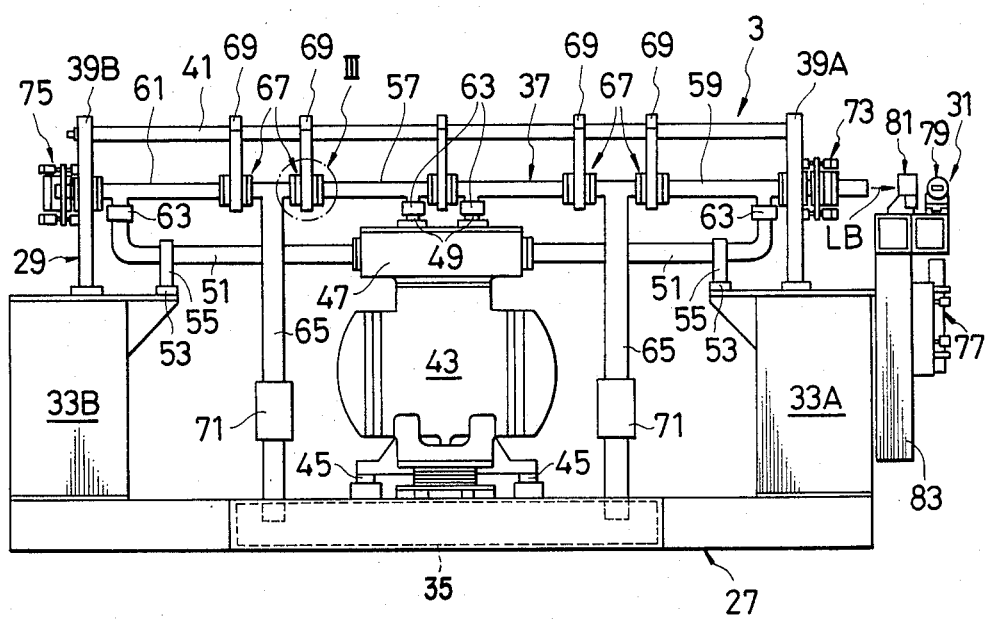
FIG. 2 is a front elevational view of the laser oscillator according to the present invention.

Now referring to FIGS. 2, the laser oscillator 3 comprises a support trestle 27 which supports the whole oscillator, a laser oscillation or lasing section 29 which is supported on the support trestle 27, and an adjustment attachment section 31 which is used for adjustment of the optical system of the laser processing system 1 and/or for adjustment of the mirrors in the laser oscillation section 29. That is to say, the support trestle 27 is constructed of a plurality of square pipes arranged in a rectangular shape; box-shaped support platforms 33A and 33B, which stand on the right and left sides of the support trestle 27, in turn support the laser oscillation section 29. The adjustment attachment section 31 may be mounted on the support platform 33A on the output side of the laser oscillation section 29.

As clearly understood from FIG. 2, in order to cool the laser gas comprising a gas mixture of He, $N_2$ and $CO_2$ recirculated from the laser oscillation section 29, a relatively large main heat exchanger 35 is provided at the central portion of the support trestle 27. The main heat exchanger 35 is provided with bent tubes for receiving a coolant such as cooling water and with a plurality of cooling fins, etc.

The laser oscillation section 29 comprises a laser tube 37 extending in the right and left directions to resonate and amplify the excitation light. The opposite ends of the laser tube 37 are supported by vertical support plates 39A, 39B which are supported by the support plateforms 33A dn 33B. The support plates 39A, 39B extend in the forward and rearward directions, perpendicular to the direction in which the laser tube 37 extend. The support plates 39A, 39B are integrally connected by a plurality of tie rods 41.

In order to supply laser gas to the insides of the laser tube 37, the laser tube 37 is connected to a gas circulation drive means 43, and in addition, in order to cool the laser gas which is heated by electrical discharges inside the laser tube 37, the laser tube 37 is connected to the main heat exchanger 35. That is to say, the gas circulation drive means comprising, for instance, a Root's blower, 43 receives laser gas that has been cooled inside the main heat exchanger 35 and supplies it to the laser tube 37. Gas circulation means 43 is supported on top of the main heat exchanger 35 through a plurality of vibrationabsorbing pieces of rubber 45.

On the upper part of the gas circulation drive means 43, there is an auxiliary heat exchanger 47 to remove the heat produced by the gas circulation drive means 43 and to insure adequate cooling of the laser gas supplied to the laser tube 37.

The auxiliary heat exchanger 47 might for example be a heat exchanger that uses cooling water and be of a box shape. A plurality of connecting pipes 49 are mounted vertically on the top surface of the auxiliary heat exchanger 47, and there are a plurality of connecting pipes 51 each having a base horizontally connected to either side of the auxiliary heat exchanger 47.

The tips of each of the connecting pipes 51 extend to near the opposite ends of the laser tube 37, and the connecting pipe 51 is supported near the tips thereof through vibration-absorbing pieces of rubber 53 by supporting blocks 55 mounted on the support platforms 33A and 33B. Consequently, the vibrations of the gas circulation drive means 43 are not transmitted to the support trestle 27 and/or to the support platforms 33A and 33B.

In order to supply the laser gas which is ejected from the gas circulation drive means 43 to the laser tube 37, the connecting pipes 49 are connected to the laser tube 37 near the center thereof. The tips of each of the connecting pipes 51 are connected near the opposite ends of the laser tube 37. More specifically, the laser tube 37 is divided in three sections of a central tube 57 and end tubes 59, 61 at the opposite sides of the central tube 57, and the connecting pipe 49 is connected to the central tube 57 and the connecting pipes 51 are respectively connected to the end tubes 59 and 61, through flexible joints 63 which are made of cylindrical pieces of silicone rubber, etc. Consequently, the vibrations of the gas circulation drive means 43 are not transmitted to the laser tube 37, and small shifts in any direction in the relative positions of the connecting pipes 49 and the laser tube 37 are taken up by the flexible joints.

In order to produce electrical discharges in laser tube 37, anode and cathode pairs are mounted at a plurality of locations in the laser tube 37. In order to cool the laser gas that is heated by the electrical discharges in the laser tube 37, the laser tube 37 is connected to the main heat exchanger 35. That is to say, each of the joints 63 has a cathode (not shown) provided in place in the laser tube 37 and a corresponding anode (not shown) provided therein, respectively. Connected between the central tube 57 and the end tubes 59 and 61 of the laser tube 37 through a plurality of cathode assemblies 67 are gas recirculation paths 65, of which the upper ends are T-shaped and the lower ends are connected to the main heat exchanger 35 through bellows. The joint assemblies 67 are supported by a holder plate 69 supported by the tie rods 41 connected to the right and left support plate 39A and 39B. Consequently, the laser gas that is supplied from the gas circulation drive means 43 through the auxiliary heat exchangers 47 to the laser tube 37 flows back to the main heat exchanger 35 through the gas recirculation paths 65 and, after being cooled in the main heat exchanger 35, is fed to the gas circulation drive means 43, cooled further securely, by the auxiliary heat exchanger and then supplied again to the laser tube 37.

As clearly understood from the foregoing description, a plurality of locations are provided in the laser tube 37, where electrical discharges are produced by the anode and cathode pairs and the laser gas heated by the electrical discharges in the laser tube 37 is recirculated back to the main heat exchanger 35 through each of the gas recirculation paths 65. In order to neutralize the laser gas that has been ionized by electrical discharges in the laser tube 37, a suitable catalyst is placed in the midway of each gas recirculation path 65. That is to say, in the midway of each gas recirculation path 65, there is an enlarged portion 71, and within the enlarged portion 71, there is a honeycomb-shaped activated alumina catalyst which might, for example, contain platinum.

In the configuration described above, the catalyst in each of the gas circulation paths 65 is heated by the laser gas, which increases the effectiveness of the catalyst. The laser gas which passes through the enlarged portion containing catalyst is neutralized by the action of the catalyst and then flows back to the main heat exchanger 35 as a neutral gas. Consequently, wasteful electrical discharges which would otherwise tend to occur between the cathodes and the main heat exchanger 35 are suppressed, thereby increasing the efficiency of the input power.

Also as clearly understood from FIG. 2, in order to produce resonance and amplification of the excitation light excited by electrical discharges in the laser tube 37, an output mirror assembly 73 and a rear mirror assembly 75 are provided such that the output mirror assembly 73 which has an output mirror therein is mounted on one end of the laser tube 37, while the rear mirror assembly 75 containing a suitable reflecting mirror therein is mounted on the other side of the laser tube 37. The output mirror assembly 73 and the rear mirror assembly 75 are mounted on the support plates 39A and 39B through bellows so that their orientation can be adjusted freely. Consequently, the mirror adjustment of the laser oscillation section 29 is made by suitable adjustment in orientation of each of the output mirror assembly 73 and the rear mirror assembly 75.

Referring to FIG. 2, the attachment section 31 comprises a helium-neon laser oscillator 77, a beam bender 79, a beam damper 81, etc. The helium-neon oscillator 77 is to be used in the adjustment of mirrors in the output mirror assembly 73, the rear mirror assembly 75 and other associated optics in the laser oscillation section 29, and in the adjustment of the optical system in the laser processing system 1. As is clear from FIG. 2, the helium-neon laser oscillator 77 is vertically mounted on a support bracket 83 mounted on the support platform 33A. The beam bender 79 is provided with a reflecting mirror or prism as a beam bending section to selectively bend the laser beam from the helium-neon laser oscillator 77 either into the laser tube 37 in the laser oscillation section 29 or toward the laser processing system 1. The beam bender 79 is located above the helium-neon laser oscillator 77 in the present embodiment. The beam damper 81 can absorb or block the laser beam LB from the output mirror assembly 73 in the laser oscillation section 29 and is free to move forward and backward with reference to the path of laser beam LB.

In the construction mentioned above, the beam bender 79 is properly moved forward and backward, and when the beam bender 79 is positioned at a crossing point where the laser beam LB from the laser oscillation section and the laser beam from the helium-neon laser oscillator 77 intersect with each other, the laser beam from the helium-neon laser oscillator can be led toward the laser tube 37 or toward the laser processing system 1. Therefore, the helium-neon laser oscillator 77 can be used for the mirror adjustment of the laser oscillation section 29 and the adjustment of the optical system in the laser processing system 1.

The backward movement of the beam bender 79 from the crossing point can be detected by a limit switch etc. which is adapted to come into contact with the beam bender 79 at the backward position thereof. Laser damper 81 has a similar construction as the beam bender 97 to move toward and from the passage of the laser beam LB. The beam damper 81 may be a metallic member in a conical shape which s well polished to absorb the laser beam LB by repeated reflecton, and always cooled by water, etc. Since the laser beam LB is prevented from advancing by the beam damper 81 when located in the passage of the laser beam LB, any unexpected accident which would be otherwise caused by careless supply of the laser beam LB to the laser processing system 1 can be avoided. Whether the beam damper 81 is located on the passage of the laser beam LB or not is detected by limit switches arranged in correspondence with the forward position or backward position.

Figure 3:
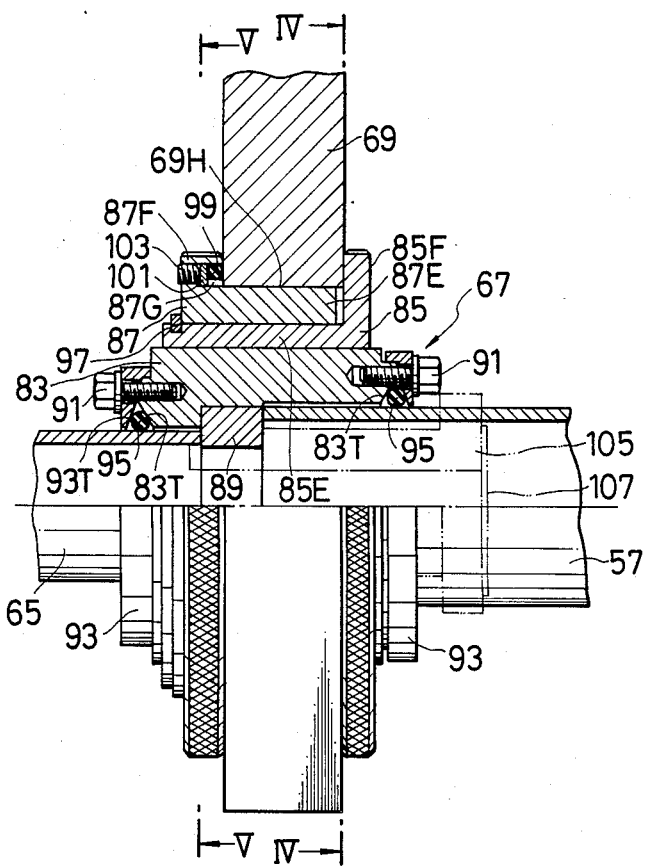
FIG. 3 is an enlarged view of the portion indicated by the arrow III in FIG. 2.

In order to maintain the linearity of said laser tube 37 and gas circulator 65 and to improve the overall linearity of the laser tube 37, the joint assembly 67 has a centering adjustment mechanism. In more detail, as shown in FIG. 3, in the joint assembly 67 there is a cylindrical joint holder 83 which supports one end of the center tube 57 of the laser tube 37 and the upper end of the gas circulator 65. This joint holder 83 is mated to and supported by the cylindrical inner eccentric holder 85 so that it is free to rotate. The inner eccentric holder 85 is fitted into the cylindrical outer eccentric holder 87 so that it is free to rotate. The outer eccentric holder 87 is supported in the support hole 69H of the holder plate 69 so that it is free to rotate.

Inside the said joint holder 83 there is a ring-shaped stopper 89 which is free to contact the end of the center tube 57 and the end of the gas circulator 65. In addition, tightening rings 93 are attached to both ends of the joint holder 83 by a plurality of bolts 91. The tapered sections 83T and 93T are formed in the surfaces of the lightening rings 93 and the joint holder 83 which contact each other. An O-ring 95 which supports the center tube 57 and the gas circulator 65 is supported between the tapered sections 83T and 93T. Consequently, by appropriately adjusting the tightening of the tightening ring 93 by the bolts 91, the center tube 57, etc. can be easily attached to or removed from the joint holder 83.

Figure 4:
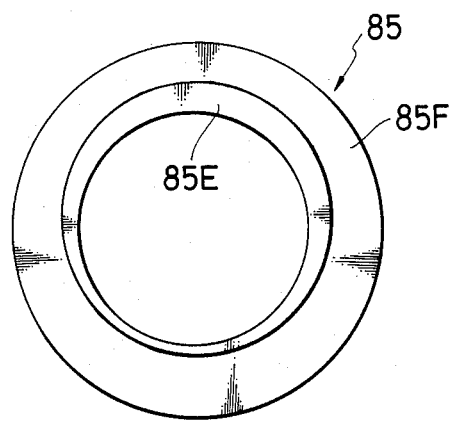
FIG. 4 is a cross-sectional view taken along the line IV—IV in FIG. 3 with only key portions depicted.

The said inner eccentric holder 85, as can be seen from FIG. 3 and FIG. 4, is formed in such a way that there is a flange 85F at one end of the eccentric cylindrical section 85E. The flange 85F of the inner eccentric holder 85 is in contact with one side surface of the said holder plate 69. A snap ring 97 is attached to the other end of the eccentric cylindrical section 85E of the inner eccentric holder 85 to prevent the said outer eccentric holder 87 from coming loose.

Figure 5:
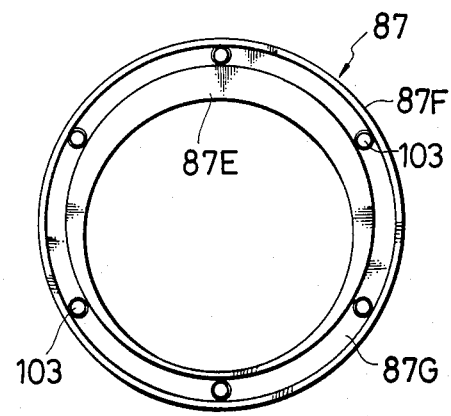
FIG. 5 is a cross-sectional view taken along the line V—V in FIG. 3 with only key portions depicted.

The said outer eccentric holder 87, as is clear from FIG. 3 and FIG. 5, is formed in such a shape that there is a flange 87F at one end of the eccentric cylindrical section 87E. The said flange 87F is in contact with the surface of the other side of the said holder plate 69. A circumferential groove 87G is formed in the surface along which the flange 87F contacts the holder plate 69. An O-ring 99, and a pressure ring 101 which presses against the outer side surface of the holder plate 69, are inside this circumferential groove 87G. A plurality of adjusting screws 103 are screwed into part of the circumferential groove 87G to adjust the pressure of the pressure ring 101.

In the said configuration, the holder plate 69 is scissored between the flange 85F of the inner eccentric holder 85 and the flange 87F of the outer eccentric 87. By adjusting the tightening of the plurality of adjusting screws 103, it can be made either easy or hard for the inner and outer eccentric holders 85 and 87 to rotate. When the inner and outer eccentric holders 85 and 87 can rotate, by rotating one or the other of the eccentric holders 85 or 87 or both, as appropriate, the orientation of the axis of the joint holder 83 which is supported by the inner eccentric holder 85 can be adjusted to be in any direction which is perpendicular to the optical axis. Consequently, the axis of the center tube 57, etc. which are supported by the joint holder 83 can be made to coincide with the laser beam axis.

The axis of the said center tube 57 etc. is made to coincide with the laser beam axis by making the axis of the joint holder 83 coincide with the laser beam axis. Consequently, in order to make the axis of the center tube 57, etc. coincide with the laser beam axis, it is sufficient to make the axis of the joint holder 83 coincide with the laser beam and, the adjustment necessary to make the axis of the joint holder 83 coincide with the laser beam axis can be easily performed as follows.

Before supporting the center tube 57, etc. on the joint holder 83, a cylindrical attachment 105 is mounted on the joint holder 83 as shown by the imaginary lines in FIG. 3. Then the laser beam from the said helium-neon laser oscillator 77 is irradiated on the laser oscillation section 29 of the laser oscillator 3 through the beam bender device 79. Then the laser beam from the helium-neon laser oscillator 77 is irradiated on the membrane member 107 of the attachment 105. By rotating the inner and outer eccentric holders 85 and 87 by appropriate amounts so as to adjust so that the laser beam shines on the center of the membrane member 107, the axis of the joint holder 83 can be made to coincide with the laser beam axis.

After confirming that the axis of the joint holder 83 coincides with the laser beam axis through the procedure described above, the attachment 105 is removed from the joint holder 83. Then, when the center tube 57, etc. are supported, the axis of the center tube 57, etc. will coincide with the laser beam axis.

As can be understood from the embodiment described above, this invention makes it possible for a laser tube axis to be made to coincide with the laser beam axis with a simple configuration. Consequently, in an axial flow type laser oscillator, the absence of part of the laser beam mode pattern and the resulting drop in output which are caused by deviation of the laser tube axis from the laser beam axis can be prevented.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A laser oscillator laser tube holder for a laser tube used in a laser oscillator in which a laser oscillator support plate supports a cylindrical joint holder which supports a connecting section of said laser tube in said laser oscillator, comprising: an inner eccentric holder for rotatably supporting said joint holder in a fitting relationship, an eccentric cylindrical section formed in said inner eccentric holder, an outer eccentric holder for rotatably supporting said eccentric cylindrical section of said inner eccentric holder in a fitting relationship, and an eccentric cylindrical section formed in said outer cylindrical holder and rotatably mated with and supported by the laser oscillator support plate.

2. The laser tube holder as described in claim 1, wherein said inner eccentric holder and said outer eccentric holder are provided with flanges, said laser oscillator support plate is supported between the inner eccentric holder flange and the outer eccentric holder flange, and an elastic body for applying shearing pressure is installed on either one of said flanges.

3. A holder for a laser tube in a laser tube oscillator wherein the laser tube is supported on a support plate in the laser tube oscillator, comprising:
a cylindrical joint holder having means for supporting said laser tube;
an inner eccentric holder having a central cylindrical bore mating with and supporting said cylindrical joint holder, said inner eccentric holder having an outer surface extendng longitudinally in the direction of said bore and being eccentric with respect to said bore;
means for rotatably supporting said eccentric holder on said support plate whereby when said holder is rotated in said support plate, the axial alignment of said laser tube in the laser oscillator may be adjusted in a plane perpendicular to the longitudinal axis of the laser tube.

4. The holder for a laser tube of claim 3 further comprising an outer eccentric holder having a central bore mating with and rotatably supporting the outer surface of the inner eccentric holder, said outer eccentric holder further having an outer surface extending longitudinally in the direction of the bore in said outer eccentric holder, said outer surface in the outer eccentric holder being eccentric with respect to the bore in said outer eccentric holder, said outer surface in the outer eccentric holder mating with and being rotatably supported in a bore provided in said support plate.

5. The holder for a laser tube of claim 4 wherein:
a flange is formed at one end of said inner eccentric holder, said flange extending laterally away from the outer surface of said inner eccentric holder;
a flange is formed on said outer eccentric holder at the end of said outer eccentric holder opposite to the end on which the flange on said inner eccentric holder is formed, the flange on said outer eccentric holder extending laterally away from the outer surface of said outer eccentric holder, whereby;
said flanges are disposed on opposite sides of said support plate.

6. The holder for a laser tube of claim 5 further comprising means for applying pressure between said flanges and said support plate.

7. The holder for a laser tube of claim 6 wherein said pressure applying means comprise a circumferential groove in the side of one of said flanges facing said support plate, an O-ring disposed in said groove so as to contact the support plate, a pressure ring disposed in said groove contacting said O-ring, and a plurality of tightening screws threaded into said groove against said pressure ring so as to be adapted to apply pressure from said pressure ring to said O-ring against said support plate.

* * * * *